UNITED STATES PATENT OFFICE.

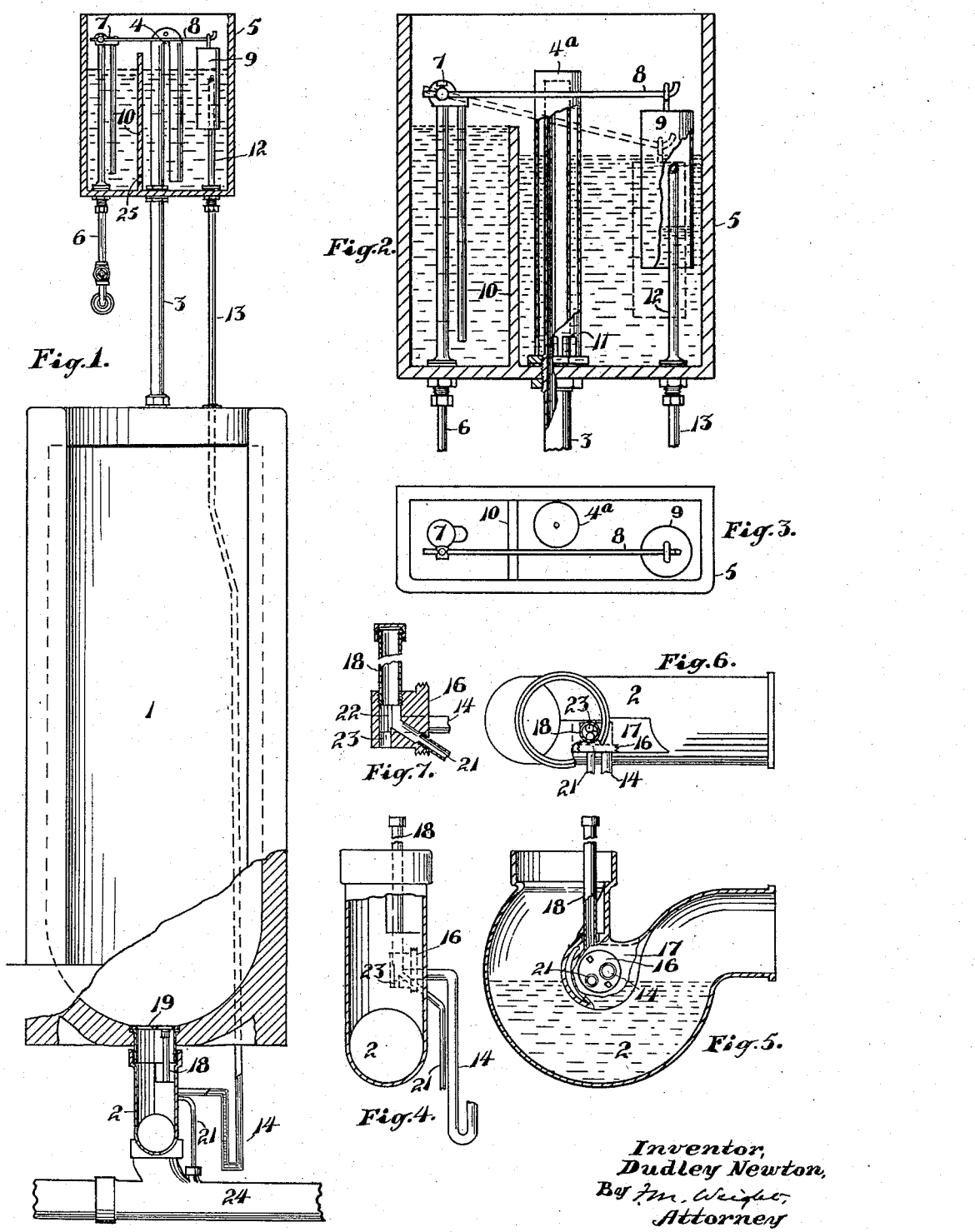

DUDLEY NEWTON, OF BERKELEY, CALIFORNIA, ASSIGNOR OF ONE-HALF TO WILLIAM A. GOERICKE, OF SAN FRANCISCO, CALIFORNIA.

DEVICE FOR FLUSHING TOILET-FIXTURES.

1,201,752.

Specification of Letters Patent.

Patented Oct. 17, 1916.

Application filed February 2, 1916. Serial No. 75,670.

*To all whom it may concern:*

Be it known that I, DUDLEY NEWTON, a citizen of the United States, residing at Berkeley, in the county of Alameda and State of California, have invented new and useful Improvements in Devices for Flushing Toilet-Fixtures, of which the following is a specification.

This invention relates to self-flushing tanks for urinals, water-closets and similar fixtures, which automatically flush after being used, and the object of the invention is to provide a self-flushing tank of simple and inexpensive construction and certain and reliable in operation.

In the accompanying drawing, Figure 1 is a broken front view of an ordinary stall urinal equipped with my invention; Fig. 2 is an enlarged broken front view of a modified form of tank and parts contained therein; Fig. 3 is a plan view of the tank shown in Fig. 2; Fig. 4 is an enlarged broken front view of a sanitary trap; Fig. 5 is a broken side view of the same, looking at right angles to Fig. 4; Fig. 6 is a plan view of the same; Fig. 7 is a broken vertical section of a siphon support.

Referring to the drawing, 1 indicates the main body portion of a stall urinal, discharging into a sanitary trap 2, and supporting at the top a flushing pipe 3, connected with a siphon 4, in a tank 5, having a supply pipe 6 controlled by a valve 7, actuated by a lever 8, from which is suspended an open-bottom float 9, which also acts as an air container. I preferably divide the tank into two compartments by a partition 10, my object being to provide a tank of sufficient length for the lever 8, and of sufficient height in which the air container can operate, and at the same time to restrict the amount of water which is supplied in the flushing operation, this amount being in general one gallon for urinals.

In the modification of the invention shown in Fig. 2, a siphon 4ª is used of a form differing from that of the siphon 4 in Fig. 1, and consisting of a tube having a closed top surrounding a tube having an open top, the outer tube having inlet apertures 11 at the bottom. A tube 12, secured to the bottom of the tank, enters the open bottom of the air container 9 and communicates with a tube 13 leading from the tank downward to about the level of the trap 2, being there bent upwardly to form a trap 14. Said trap is connected to a cylindrical piece 16 preferably of brass, which may be termed a siphon support, and is screwed into a box-like extension 17 formed on one side of the sanitary pipe 2. Into the top of said siphon support is also screwed a cleanout pipe 18, which extends upwardly to near the under side of the strainer 19 from the urinal. Into said siphon holder is also secured the upper end of a tube 21, which may be termed a suction tube, for a reason which will hereinafter appear. The trap 14, the pipe 18 and the tube 21 all communicate with a chamber 22 in the siphon support, from which also leads a port 23, communicating with the back part of the sanitary trap, and leading to the waste pipe 24, with which also the sanitary trap communicates. The siphon support is located so that the tube 21 is just above the normal level of the water in the trap 2.

The apparatus operates in the following manner:—When the tank is filled, the air in the pipe 13 and air container 9 is compressed until its pressure just balances the weight of a column of water equal in height to the difference of levels of the water in the tank and in the air container, and the water stands at such a height in the upwardly extending branch of the trap 14, that said pressure also just balances the column of water equal to the differences of levels between the two sides of the trap 14. When liquid is discharged from the urinal through the strainer 19 into the sanitary trap 2, liquid rises in the port 23 and overflows into the pipe 21, and the liquid runs down said pipe 21, while the liquid is flowing into the trap 2. When liquid no longer flows into the trap 2, but flows out through the pipe 21, suction is produced in said pipe 21, and therefore also in the chamber 22, which has the effect of sealing the opening from the port 23 into the trap 2, although no liquid is being supplied to said trap 2, and also has the effect of causing the liquid in the trap 14 to flow over into the chamber 22 and out through the tube 21. This has the effect of disturbing the balance between the pressures of the compressed air in the pipe 13 and air container 9, and of the water in the trap 14, so that the water immediately escapes from the trap 14 into the chamber 22, and, following the water, the compressed air also escapes from the pipe 13 into said chamber 22 and into the sanitary trap 2. The result of this is that the air container, being no longer sustained by the pressure of the air therein, drops, and opens the valve 7, so that water flows into the tank either over the top of the partition 10, as shown in Fig. 2, or through the hole 25 at the bottom of the partition, as shown in Fig. 1, until its level has reached the top of the siphon. The siphon then operates to flush the urinal, the flush ceasing when the siphon is broken by the level of the water in the tank falling below the openings 11 or the mouth of the siphon.

When the air container falls sufficiently low to rest upon the pipe 12, said pipe 12 forms, with the air container, a siphon, the water flowing up in the air container and down in the pipe 12 and through the trap 14 into the chamber 22, where the water is divided, part flowing through the port 23 and part through the pipe 21, thoroughly flushing and cleaning these parts. Said siphoning action continues until the level of the water in the tank has fallen below the lower edge of the air container. Thereupon the siphon is broken, free air entering around the bottom of the air container and flowing into the pipe 12, the water in which pipe settles to a level lower than the outlet end of the trap 14.

As the water flowing through the valve 7 fills the tank, the air container and float 9 is raised, air being entrapped therein and in the pipe 13, and being gradually compressed as the water rises and fills the tank, and as the air is compressed, water is forced upwardly in the outlet side of the trap 14. The valve 7 is closed by the rising of the air container 9.

I claim:—

1. The combination, with a fixture, of a flushing tank for flushing said fixture, a conduit leading from the flushing tank to the fixture, an air container in the flushing tank supported by the pressure of the air therein, means whereby the air container, when so supported, prevents the flow of flushing water to the fixture, and means for reducing the pressure of the air in the air chamber.

2. The combination, with a fixture, of a flushing tank for flushing said fixture, a conduit leading from the flushing tank to the fixture, an air container in the flushing tank supported by the pressure of the air therein, means whereby the air container, when so supported, prevents the flow of flushing water to the fixture, and means actuated by the discharge of liquid from the fixture for reducing the pressure of the air in the air container.

3. In a device for flushing toilet fixtures and the like, the combination with the fixture, of a tank, means for maintaining a normal level of water therein, a flushing pipe leading from the tank to the fixture, a trap communicating with the discharge end of the fixture, a conduit leading from the tank and having a trap therein, said latter trap communicating with the outlet side of the other trap, a suction pipe leading from said communication between the traps and substantially air-tight at the top, and an air container in said tank having a closed top and an open bottom, the latter being below the normal level of the water therein, said air container communicating with said conduit.

4. In a device for flushing toilet fixtures and the like, the combination with the fixture, of a tank, means for maintaining a normal level of water therein, a flushing pipe leading from the tank to the fixture, a trap communicating with the discharge end of the fixture, a conduit leading from the tank and having a trap therein, said latter trap communicating with the outlet side of the other trap, a suction pipe leading from said communication between the traps and substantially air-tight at the top, and an air container in said tank having a closed top and an open bottom, the latter being below the normal level of the water therein, said air container communicating with said conduit and forming a part of said means.

5. In a device for flushing toilet fixtures and the like, the combination with the fixture, of a tank, means for maintaining a normal level of water therein, a flushing pipe leading from the tank to the fixture, a trap communicating with the discharge end of the fixture, a conduit leading from the tank and having a trap therein, said latter trap communicating with the outlet side of the other trap, a suction pipe leading from said communication between the traps and substantially air-tight at the top, a clean-out pipe communicating with said chamber, and an air container in said tank having a closed top and an open bottom, the latter being below the normal level of the water therein, said air container communicating with said conduit.

6. In a device for flushing toilet fixtures and the like, the combination, with the fixture, of a tank, means for maintaining a normal level of water therein, a flushing pipe leading from the tank to the fixture, a trap communicating with the discharge end of the fixture, a closed chamber communicating with the trap near the normal level of the liquid therein, a suction pipe leading from said chamber, a conduit leading from the tank and having a trap therein, the outlet side of said trap communicating with said chamber, a clean-out pipe communicating with said chamber, and a movable air container in said tank below the normal level of the water therein and communicating with said conduit, said air container forming part of said means.

In testimony whereof I have hereunto set my hand in the presence of two subscribing witnesses.

DUDLEY NEWTON.

Witnesses:
F. M. WRIGHT,
D. B. RICHARDS.